(12) United States Patent
Marcicki et al.

(10) Patent No.: US 11,084,398 B2
(45) Date of Patent: Aug. 10, 2021

(54) METHOD OF OPERATING THERMAL MANAGEMENT SYSTEM IN ELECTRIC VEHICLES

(71) Applicant: Ford Global Technologies, LLC, Dearborn, MI (US)

(72) Inventors: James Matthew Marcicki, Livonia, MI (US); Devang Bhalchandra Dave, Ann Arbor, MI (US); Xiao Guang Yang, Northville, MI (US); Pratima Addepalli, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 513 days.

(21) Appl. No.: 15/871,684

(22) Filed: Jan. 15, 2018

(65) Prior Publication Data
US 2019/0217721 A1      Jul. 18, 2019

(51) Int. Cl.
*B60L 58/26* (2019.01)
*B60K 1/04* (2019.01)
*H01M 10/613* (2014.01)
*H01M 10/625* (2014.01)
*H01M 10/63* (2014.01)
*H01M 10/6556* (2014.01)
(Continued)

(52) U.S. Cl.
CPC .......... *B60L 58/26* (2019.02); *B60K 1/04* (2013.01); *H01M 10/613* (2015.04); *H01M 10/625* (2015.04); *H01M 10/63* (2015.04); *H01M 10/6556* (2015.04); *B60K 11/02* (2013.01); *B60K 2001/005* (2013.01); *B60K 2001/0416* (2013.01); *B60W 20/15* (2016.01); *H01M 2220/20* (2013.01)

(58) Field of Classification Search
CPC .......... B60L 58/26; B60L 2240/545; B60L 2240/662; B60L 3/0046; B60K 1/04; B60K 11/02; B60K 2001/0416; B60K 2001/005; B60K 1/00; H01M 10/613; H01M 10/625; H01M 10/63; H01M 10/6556; H01M 2220/20; H01M 10/486; H01M 10/66; B60W 20/15
USPC ...................................................... 701/36
See application file for complete search history.

(56) References Cited

U.S. PATENT DOCUMENTS 8,620,506 B2   12/2013   Kummer et al.
8,648,603 B2   2/2014    Harada
(Continued)

FOREIGN PATENT DOCUMENTS

WO       2016083529 A1    6/2016

OTHER PUBLICATIONS

"Preconditioning the i3 a cold winter day and effect on range," BMW i3 Owner, Jan. 15, 2016, https://bmwi3owner.com/2016/01/preconditioning/.

*Primary Examiner* — Maceeh Anwari
(74) *Attorney, Agent, or Firm* — David Kelley; Brooks Kushman, P.C.

(57) ABSTRACT

A method controlling a battery management system is provided. The method may include commanding by a controller a heat exchanger of a vehicle to pre-cool a traction battery of the vehicle key-off responsive to the vehicle being within a predetermined range of a predicted parking location, a current temperature of the traction battery being less than a temperature threshold, and a predicted parked temperature for the traction battery being greater than the temperature threshold.

19 Claims, 4 Drawing Sheets

(51) Int. Cl.
*B60K 11/02* (2006.01)
*B60W 20/15* (2016.01)
*B60K 1/00* (2006.01)

(56) References Cited

U.S. PATENT DOCUMENTS

| | | |
|---|---|---|
| 9,431,849 B2 | 8/2016 | Yan et al. |
| 9,446,682 B2 | 9/2016 | Gauthier et al. |
| 9,649,944 B2 | 5/2017 | Liu |
| 9,676,283 B2 | 6/2017 | Jackson et al. |
| 2009/0326749 A1 | 12/2009 | Uchida |
| 2015/0306974 A1* | 10/2015 | Mardall .............. H01M 10/625 320/150 |
| 2016/0129797 A1* | 5/2016 | Jackson .................. B60L 58/26 320/109 |

* cited by examiner

METHOD OF OPERATING THERMAL MANAGEMENT SYSTEM IN ELECTRIC VEHICLES

TECHNICAL FIELD

The present disclosure relates to a control method for an electric vehicle thermal management system.

BACKGROUND

Hybrid electric vehicles and electric vehicles use a motor to propel the vehicle. Power is supplied to the motor by a battery. The battery is configured to store an electrical charge that may also be used to power other vehicle components. Efficient use of the battery allows the vehicle to be propelled by the motor and extends the life of the battery. This may be achieved by using a cooling arrangement.

It is known to intermittently cool the vehicle battery while the vehicle is parked to reduce battery degradation over the life of the battery. But cooling the battery while the vehicle is parked and the driver is away may create a discontinuity between the expected state of charge and the actual state of charge when the driver returns.

SUMMARY

According to one embodiment of this disclosure, a method of controlling a battery management system is provided. The method may include commanding by a controller a heat exchanger of a vehicle to pre-cool a traction battery of the vehicle key-off responsive to the vehicle being within a predetermined range of a predicted parking location, a current temperature of the traction battery being less than a temperature threshold, and a predicted parked temperature for the traction battery being greater than the temperature threshold.

According to another embodiment of this disclosure, a vehicle having a traction battery, battery chiller, and a controller is provided. The battery chiller may be configured to cool the traction battery. The controller may be programmed to power the battery chiller to pre-cool the traction battery before vehicle key-off, responsive to the vehicle being within a predetermined range of a predicted parking location, a current temperature of the traction battery being less than a temperature threshold, and a predicted parked temperature for the traction battery being greater than the temperature threshold.

According to yet another embodiment of this disclosure, a vehicle including a traction battery and a controller is provided. The controller maybe programmed to power a heat exchanger to pre-cool the traction battery responsive to the vehicle being plugged in and charging, a predicted parked temperature for the traction battery associated with a predicted parking event for a predicted trip being greater than a first temperature threshold, and a current temperature of the traction battery being less than the first temperature threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
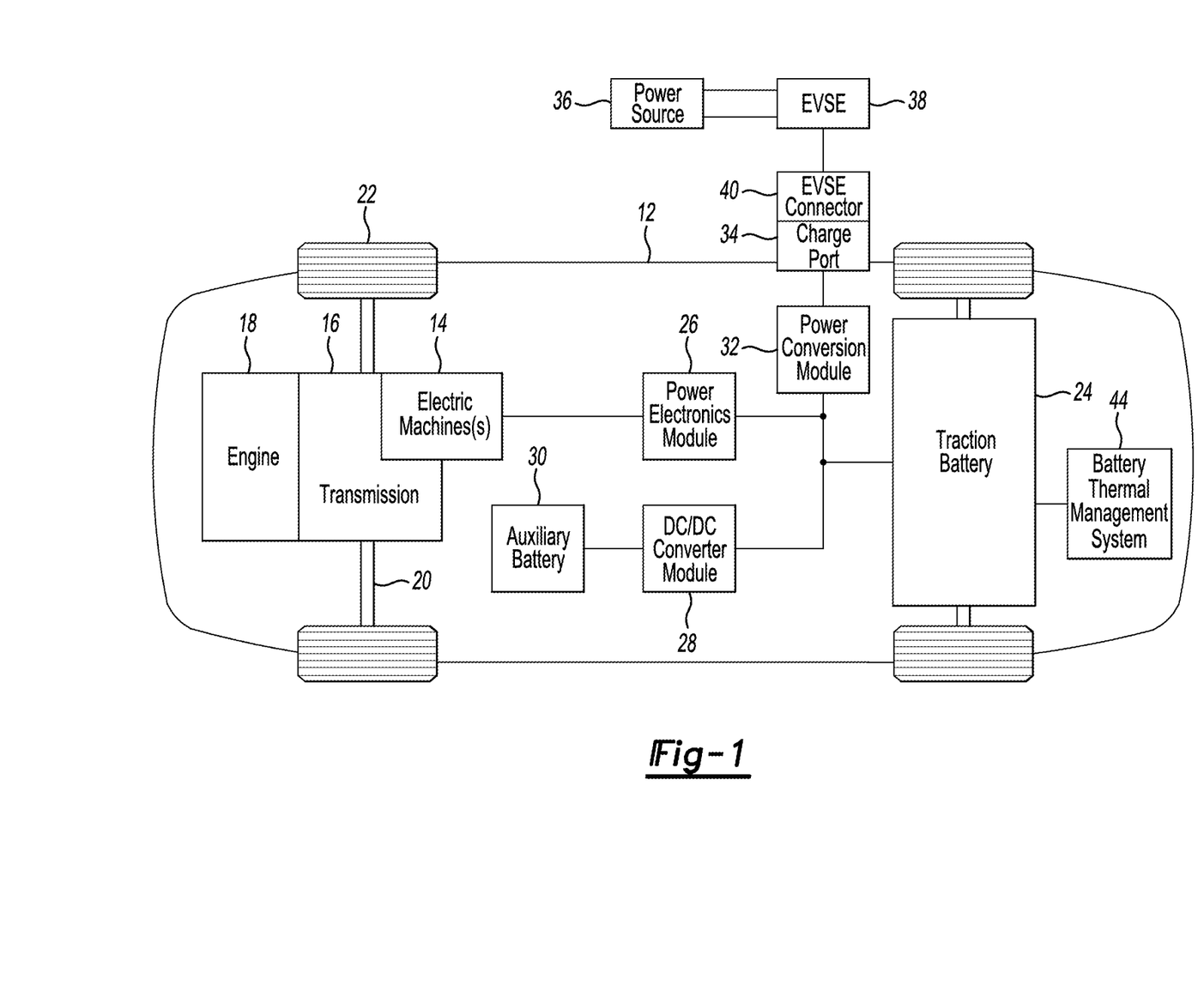
FIG. 1 is a schematic diagram of an example thermal management system for a battery-electric vehicle (BEV) or battery-hybrid-electric vehicle (BHEV).

FIG. 1 depicts a typical plug-in hybrid-electric vehicle (HEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors (not shown) may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery). A battery thermal management system 44 is operatively connected to the traction battery 24 and the power electronics module 26. The battery thermal management system 44 may include various components including but not limited to a battery heat exchanger, a battery chiller, low temperature radiator, an inverter system controller (ISC), and a DC/DC voltage transformer. These components may be connected by various pumps and fluid lines that facilitate fluid flow of various coolants, e.g. air, liquid refrigerant, or water. For the purposes of this disclosure, the battery thermal management system is represented by the black box 44 illustrated in FIG. 1.

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

As will be described with reference to FIG. 2 below, the various components discussed may have one or more associated controllers to control and monitor the operation of the components.

Figure 2:
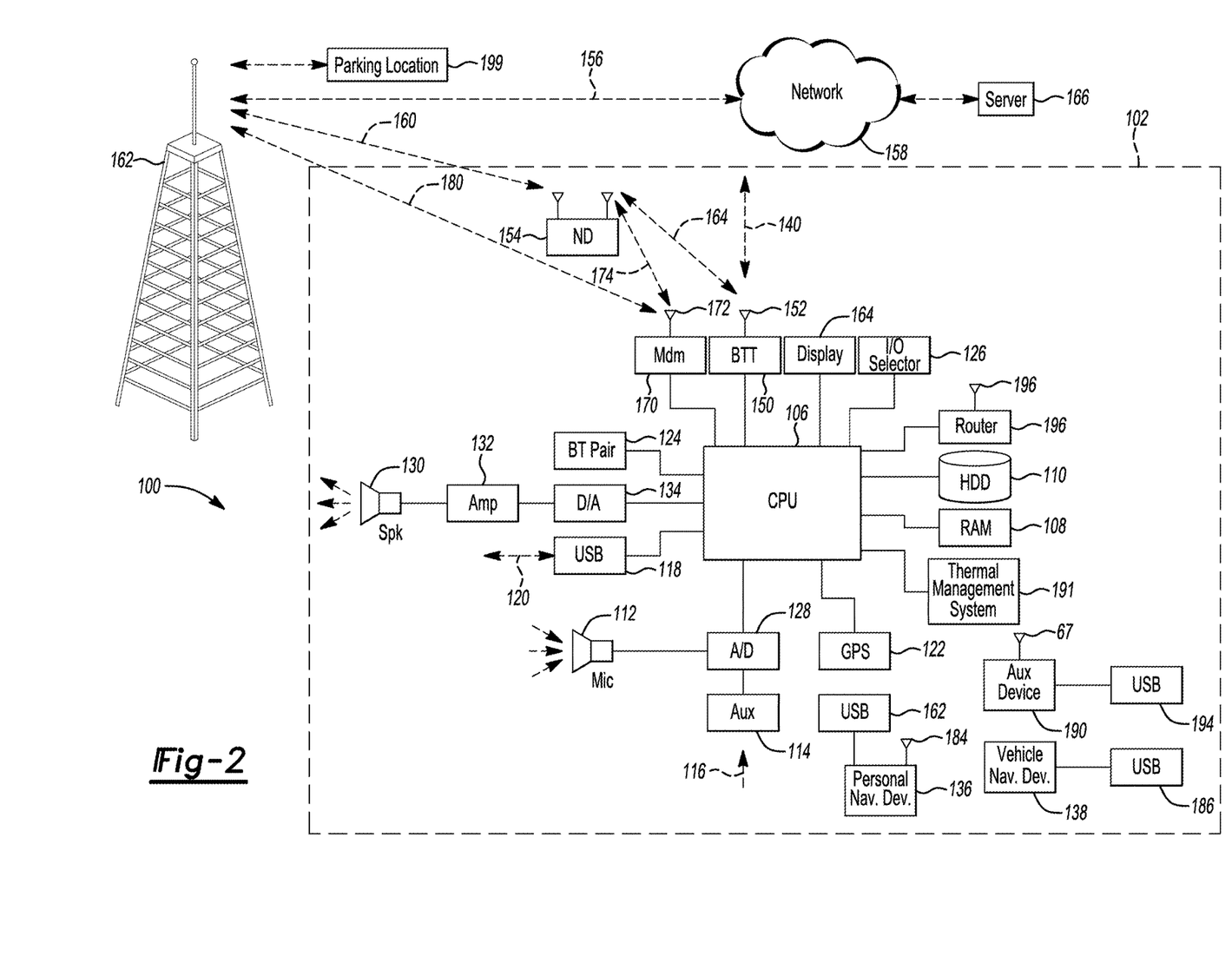
FIG. 2 is a block diagram illustrating the vehicle computing and telematic system used to execute the method.

FIG. 2 illustrates an example block topology for a vehicle-based computing system 100 (VCS) for a vehicle 12 of a battery thermal management system according to a representative embodiment. An example of such a vehicle-based computing system 100 is the SYNC system or MyFord Mobile system, or both each manufactured by THE FORD MOTOR COMPANY. A vehicle enabled with a vehicle-based computing system may contain a visual front-end interface 104 located in the vehicle 12. One or more users may be able to interact with interface 104, for example, using a touch sensitive screen. In another illustrative embodiment, the interaction occurs through button presses or spoken dialog processed by automatic speech recognition and speech synthesis systems, or through a connected personal device.

In the illustrative embodiment shown in FIG. 2, a processor 106 controls at least some portion of the operation of the vehicle-based computing system. Provided, within the vehicle, the processor allows onboard processing of commands and routines. As described in greater detail below with reference to FIG. 3, processor 106 may perform various algorithms or functions associated with detecting position of a future parking location within a particular geographic area. Further, the processor is connected to various types of non-transitory or tangible computer program products or storage media implementing both temporary or non-persistent storage 108 and persistent storage 110. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory.

System outputs may include, but are not limited to, a visual display 104 and speakers 130 or other stereo system output. In various embodiments, the visual display 104 may be used to indicate various conditions or operations of the vehicle, including but not limited to: the temperature of the battery, temperature of the cabin, ambient temperature, proximity to a parking location, and status of the thermal management system 191. Speakers 130 are connected to an amplifier 132 and receive signals from processor 106 through a digital-to-analog converter 134. Input and output signals may also be communicated via a remote BLUETOOTH device such as a personal navigation device (PND) 136, or a USB device, such as vehicle navigation device 138, along the bi-directional data streams generally represented at 140 and 120.

In one illustrative embodiment, system 100 uses a BLUETOOTH transceiver 150 to wirelessly communicate with one or more personal mobile or nomadic devices 154 (e.g., cell phone, smart phone, PDA, smart watch or any other device having wireless remote network connectivity). Nomadic device 154 can then be used to communicate 156 with a network 158 outside vehicle 12 through, for example, communication 160 with a satellite or cellular tower 162. In some embodiments, cellular tower 162 or a similar tower or antenna may function as a Wi Fi access point. Likewise, the vehicle 12 may communicate with a remote cloud server 166 over network 158 to exchange information with respect to the geographic coordinates of the vehicle's 12 current location and the location of the predicted parking space 199. Moreover, the remote cloud server 166 may convey current and predicted weather conditions or forecasts, vehicle travel history, and predicted vehicle travel, for example.

Data may be communicated between CPU 106 and network 158 utilizing, for example, a data plan, data over voice, or DTMF tones associated with nomadic device 154. Alternatively, it may be desirable to include an onboard modem 170 having antenna 172 for communication 174 of data between CPU 106 and network 158 over the voice band. Nomadic device 154 may then be used for communication 156 with network 158 outside vehicle 12 through, for example, communication 160 with cellular tower 162. In some embodiments, modem 172 may establish communication 180 with tower 162 to communicate with network 158. As one example, modem 172 may be a USB cellular modem and communication 180 may be cellular communication.

In one illustrative embodiment, processor 106 is provided with an operating system including an API to communicate with modem application software. The modem application software may access an embedded module or firmware of BLUETOOTH transceiver 152 to complete wireless communication with a remote BLUETOOTH transceiver, such as that found in nomadic device 154, for example. BLUETOOTH is a subset of IEEE 802 PAN (personal area network) protocols. IEEE 802 LAN (local area network) protocols include Wi Fi and have considerable cross functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like.

In another embodiment, nomadic device 154 includes a modem for voice band or broadband data communication. In the data-over-voice embodiment, frequency division multiplexing may be implemented allowing the owner of the nomadic device to talk over the device while data is being transferred. At other times, when the owner is not using the device, the data transfer can use the entire available bandwidth (300 Hz to 3.4 kHz in one example). While frequency division multiplexing may be common for analog cellular communication between the vehicle 12 and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbps for stationary or walking users and 385 kbps for users in a moving vehicle 12. 3G standards are now being replaced by IMT-Advanced (4G) which offers 100 Mbps for users in a vehicle and 1 Gbps for stationary users. In another embodiment, nomadic device 154 is replaced with a cellular communication device (not shown) that is installed in vehicle 12 102. In other embodiments, nomadic device 154 may be implemented by a wireless local area network (LAN) device capable of communication over, for example (and without limitation), an 802.11g network (i.e., Wi-Fi) or a WIMAX network, for example.

In one embodiment, incoming data can be passed through nomadic device 154 through onboard BLUETOOTH transceiver 150 to processor 106. In the case of certain temporary data, for example, the data can be stored on HDD 110 or mobile device or other storage media until such time as the data is no longer needed. Temporary data may include various sensor data collected for a particular trip, parking location, duration of parking, ambient temperatures associated with parking locations, and the route typically used to travel to the parking location etc. The temporary data may be communicated to one or more cloud-based services for use in determining when the vehicle is near a frequented parking location or predicted parking locations with measures of irradiance or temperature, current traffic conditions along a route between a predicted parking space 199 and the vehicle 12, required energy of cooling the battery, frequently traveled routes, destinations, etc., associated with a particular ride-sharing passenger. The temporary data may then be deleted or overwritten after communication to other computers within the network.

As previously described, various devices may interface with VCS 100, such as personal navigation device 136, having a USB connection 182 and/or an antenna 184, vehicle navigation device 138 having a USB connection 186 or other connection, onboard GPS device 122, or remote navigation system (not shown) having connectivity to network 158. As used herein, USB generally represents any of a variety of serial networking protocols that may include IEEE 1394 protocols referred to as FIREWIRE™ (Apple), i.LINK™ (Sony), and LYNX™ (Texas Instruments), EIA (Electronics Industry Association) serial protocols, IEEE 1284 (Centronics Port), S/PDIF (Sony/Philips Digital Interconnect Format) and USB-IF (USB Implementers Forum), which form the backbone of the device-device serial standards. Most of the protocols can be implemented for either electrical or optical communication.

As also shown in FIG. 2, processor 106 may communicate with a thermal management system 191. These devices may be connected through a wireless connection/antenna 192 and/or a wired connection 194. The thermal management system 191 may include, but are not limited to, the components described above with reference to FIG. 2. Processor 106 may also be connected to a vehicle based wireless router 196, using for example a Wi-Fi (IEEE 803.11) transceiver 198. This could allow processor 106 to connect to remote networks in range of vehicle based wireless router 196.

As previously described, system 100 may include a wireless transceiver, such as BLUETOOTH transceiver 152, modem 170, or router 196, for example, in communication with vehicle processor 106, which may be 106 further programmed to obtain information including a parking location 199 from a remote database of remote server 166 via network 158, for example.

As also shown in FIG. 2, the processor 106 may communicate with various other types of auxiliary devices 190. These devices may be connected through a wireless connection/antenna 192 and/or a wired connection 194. Auxiliary devices 190 may include, but are not limited to, personal media players, wireless health devices, portable computers, and the like. Processor 106 may also be connected to a vehicle based wireless router 196, using for example a Wi-Fi (IEEE 803.11) transceiver 198. This could allow processor 106 to connect to remote networks in range of vehicle based wireless router 196.

As previously described, system 100 may include a wireless transceiver, such as BLUETOOTH transceiver 152, modem 170, or router 196, for example, in communication with vehicle processor 106, which may be 106 further programmed to obtain information including a predicted parking location 199, ambient temperature, forecasted ambient temperature, status (cooling or off) of the battery thermal management system 191 to trigger cooling of the battery, for example.

Figure 3:
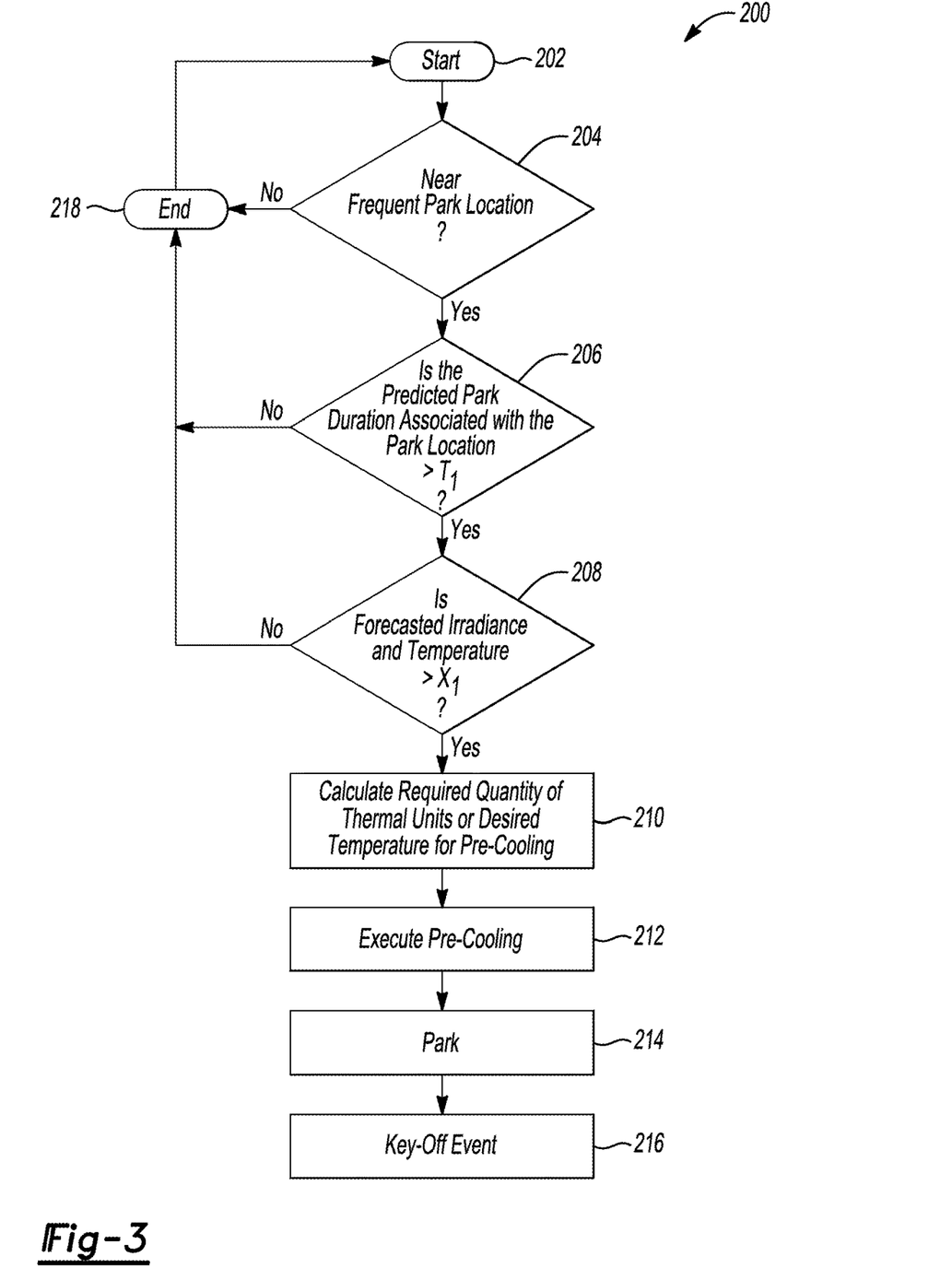
FIG. 3 is a flowchart illustrating the operation of the thermal management system according to at least one embodiment of this disclosure.

FIG. 3 is a flowchart illustrating operation of a system or method 200 for the battery thermal management system 10 according to a first embodiment. As previously described, various functions or processes illustrated may be performed in a different order, may be omitted, or may be repeatedly performed although not explicitly illustrated or described to accomplish various features and advantages described herein as those of ordinary skill in the art will understand. This flowchart represents the operation of the system or method for pre-cooling the vehicle battery 24 when the vehicle 12 is within a predetermined range of a frequented parking location 199, for example.

Controlling or operating the thermal management system 44 for the battery may include starting the vehicle 12 and traveling from a known location, as represented by 202. The vehicle 12 may be started by a "key-on" operation. The vehicle 12 may travel within a geographic vicinity that includes a stored or known parking location, as represented by 204. The processor 106 may receive a signal from the GPS 122 indicative of the vehicle's location relative to a known parking location 199. The known parking location 199 may be temporarily stored by the processor 106 after a predetermined number of trips to the parking location have been logged. Additionally, the duration or length of time the vehicle 12 is parked at the parking location 199 may be stored by the processor 106. If the vehicle 12 is not near a frequent park location 199, the controller branches to 218.

As previously mentioned, the park duration or length of time associated with the parking location 199 may be stored by the processor 106, as represented by 206. The duration may be an average or median duration selected from a sample or previous parking events associated with the location 199. In another embodiment, the value may be a percentile value chosen to optimally operate the algorithm. The processor 106 compares the selected parking duration or average duration associated with the park location 199 with a predetermined threshold $T_1$, as represented by 206. The threshold $T_1$ may vary from the average or predicted duration (actual length of time the vehicle 12 is parked). For example, if the ambient temperature associated with the park location 199 is relatively high (85° F.-105° F.) the threshold $T_1$ may be relatively short (1-2 hours). As another example, if the ambient temperature is relatively low (75° F.-85° F.) the threshold $T_1$ may be higher (6-8 hours). The threshold $T_1$ may be selected by using a look up table for the ambient temperatures at the time of parking and the predicted parking duration to determine the temperature of the battery 24 after the duration.

The processor 106 may then determine a forecasted irradiance or temperature value for the park location 199 as represented by 208. The forecasted temperature and irradiance value may then be compared to a threshold value $X_1$. The threshold value $X_1$ may be selected based on previous time-dependent temperatures (ambient temperature, cabin temperature, battery temperature) that resulted in the battery exceeding its temperature limit. These values may be stored by the processor 106 and be tied to a geographic location detected by the GPS 122.

The ambient temperatures and predicted battery temperature may be determined by various methods. For example, the processor may store various temperatures (ambient temperature, cabin temperature, historical records of the temperature associated with the parking location, logged by the processor 106, may be used. As another example, the ambient temperature near the vehicle 12 may be measured and used in conjunction with other factors to determine the predicted temperature and irradiance. The factors may include, the specific heat capacity of the vehicle 12, the specific heat capacity of the battery, the mass of the vehicle 12, the mass of the battery, among other factors.

As another example, the factors listed above may be associated with a given probability that the battery temperature will exceed a predetermined threshold. The probabilities associated with each factor would be dependent on the parking location 199 and may change with vehicle usage. The use of probabilities may be implemented using Naive Bayes classification. Naive Bayes classification constructs classifiers, models that assign class labels to problem instances, represented as vectors of feature values, where the class labels are drawn from some finite set. Each class may be updated as further parking events occur and forgetting factor may be used to eliminate data prior to a selectable historical window.

The data mentioned above may be stored by using both temporary or non-persistent storage 108 and persistent storage 110, as previously described. The stored data may then be used to calculate the desired amount of pre-cooling as represented at 210. As one example, the following equation may be used to calculate the required pre-cooling temperature:

$$T_{pre\text{-}cool} = T_{key\text{-}off} + \Delta T_{park} - T_{desired}$$ where:

$T_{desired}$ represents upper limit for the battery temperature.

$T_{park}$ represents the ambient temperature of the parking location 199.

$T_{key\text{-}off}$ may represent the temperature of the battery, the vehicle body, or the vehicle cabin at the time of a key-off event 214.

$T_{pre\text{-}cool}$ represents the amount (degrees Fahrenheit or Celsius) the temperature of the battery should be lowered before the key-off event.

As another example, a quantity of thermal energy required pre-cool the battery may be used. Thermal energy may have the units of British Thermal Units (BTUs) and be a function of specific heat of the vehicle 12 or battery and the mass of the vehicle 12 or battery 24.

The processor 106 may send a signal to the thermal management system 44 to execute the pre-cooling operation as represented by operation 212. Executing the pre-cooling operation may be accomplished by providing fluid through a battery chiller or a battery heat exchanger to cool the battery. The battery is cooled to the desired temperature before the vehicle 12 is parked, as represented by operation 214, and before a key-off event, as represented by operation 216.

Figure 4:
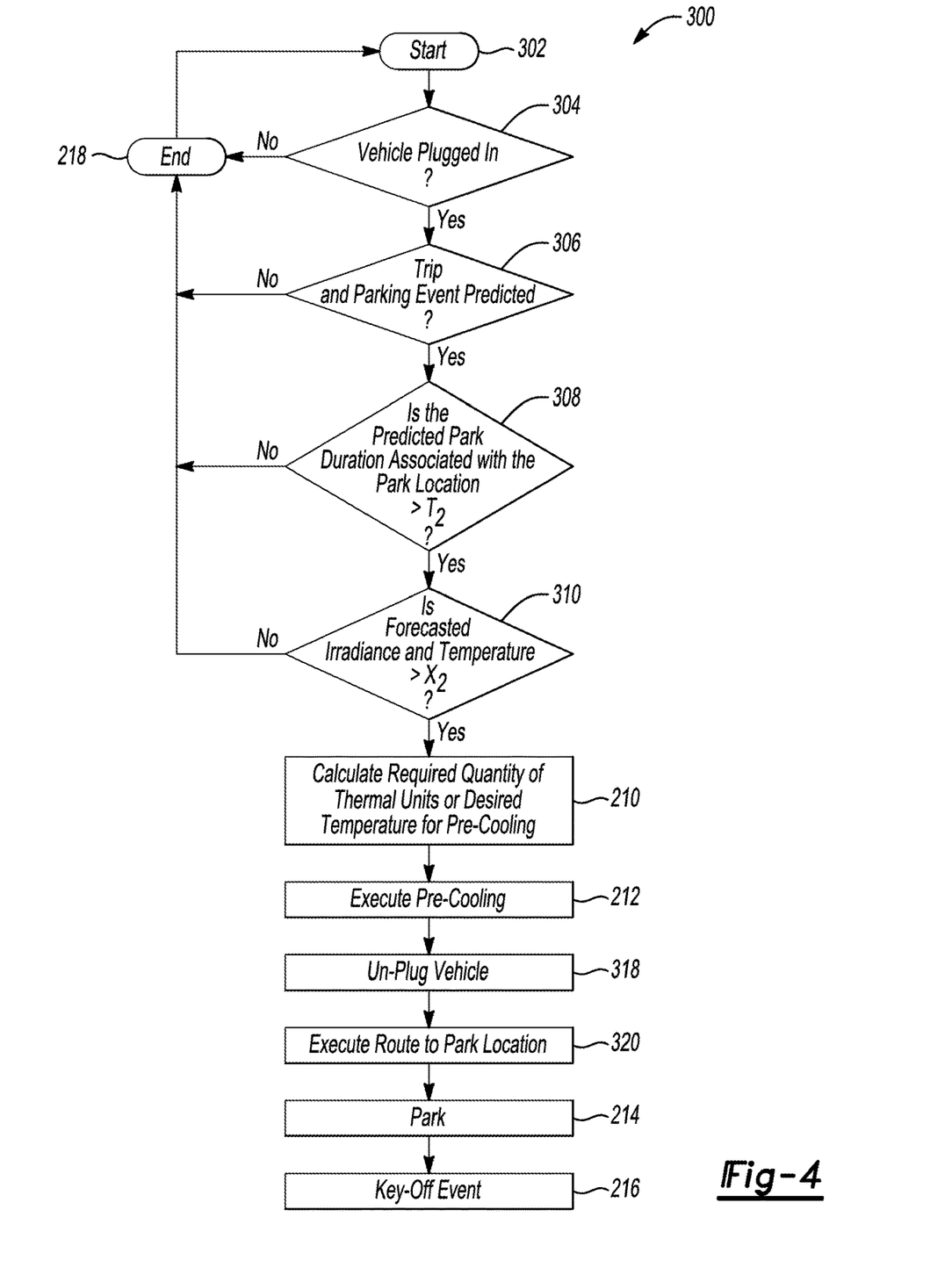
FIG. 4 is a flowchart illustrating the operation of the thermal management system according to at least one embodiment of this disclosure.

Now referring to FIG. 4, is a flowchart illustrating operation of a system or method 300 for the battery thermal management system 10 according to a second embodiment. As previously described, various functions or processes illustrated may be performed in a different order, may be omitted, or may be repeatedly performed although not explicitly illustrated or described to accomplish various features and advantages described herein as those of ordinary skill in the art will understand. This flowchart represents the operation of the system or method for pre-cooling the battery 24 when the vehicle 12 is plugged in and a trip and future parking event is predicted.

Controlling or operating the thermal management system for the battery may start at operation 302. The controller may determine whether the vehicle 12 is plugged in to receive a charge, as represented by operation 304. When the vehicle 12 is plugged in to receive a charge, the EVSE connector 40 is connected to the charge port 34. Executing the pre-cooling operation when the vehicle 12 is plugged and receiving a charge, may be more desirable than executing the pre-cooling operation while the vehicle 12 is traveling. When the vehicle 12 is plugged in, the pre-cooling operation may be executed without consuming electricity from the vehicle battery 24 to extend the range of the vehicle 12.

The processor 106 may determine whether a future trip and parking event within a certain period is likely to occur, as represented by operation 306 The determination may be based on the current location of the vehicle 12, the current day and time, as well as historical driving patterns that are stored by the processor 106. As one example, if the vehicle 12 is plugged in at a user's residence and is plugged on a workday morning, the future trip and parking event may be triggered at a predetermined amount of time before the vehicle 12 travels the route. As another example, if the vehicle 12 is parked at a public charging station that is frequently visited, e.g., the user's place of work or a restaurant that is frequented by the user, the future trip and parking event may be triggered at a predetermined amount of time before the vehicle 12 frequently starts and travels the route.

As previously mentioned, the park duration or length of time associated with the parking location 199 may be stored by the processor 106, as represented by 308. The duration may be an average or median duration selected from a sample or previous parking events associated with the location 199. The processor 106 compares the selected parking duration or average duration associated with the park location 199 with a predetermined threshold $T_2$, as represented by 308. The threshold $T_2$ may be less than the threshold $T_1$ as previously described with reference to operation 206. Because the battery is receiving a charge from the power source 36, the thermal management system 44 may be powered without diminishing the charge of the battery to extend the vehicle's 12 electrical range.

Similar to the operation 208 in FIG. 3, the processor may determine whether a forecasted irradiance or temperature value for the park location 199 as represented by 310. With the exception of the threshold $X_2$ used in operation 310, operation 310 is substantially identical to operation 208 described in FIG. 3. The threshold $X_2$ may be less than $X_1$. The threshold may be less than $X_1$ because pre-cooling the battery while the vehicle 12 is receiving a charge from the power source 36 is more advantageous than pre-cooling the battery when the vehicle 12 is nor receiving a charge. For example, if the thresholds, $X_1$ and $X_2$, are expressed as a percentage likelihood of the battery exceeding its temperature threshold, the pre-cooling operation may be engaged while the vehicle 12 is plugged in if there is only a 15% chance that the battery will exceed its temperature threshold. Whereas, the pre-cooling operation may be engaged while the vehicle is unplugged if the likelihood of the battery exceeding its temperature is greater than or equal to 50%.

The thresholds $T_2$ and $X_2$ may be used to calculate the desired quantity of thermal units or desired temperature for pre-cooling as represented by operation 210. Because operation 210 in FIG. 4 is identical to operation 210 described in FIG. 3, the details of the operation are described above. The processor 106 may send a signal to the thermal management system 44 to execute the pre-cooling operation as represented by operation 212. Executing the pre-cooling operation may be accomplished by providing fluid through a battery chiller or a battery heat exchanger to cool the battery.

The battery may be cooled to the desired temperature before the vehicle 12 is unplugged as represented by operation 318. In the case that the battery cannot be pre-cooled to the desired temperature before unplugging the vehicle 12, the thermal management system may continue to pre-cool the battery after the vehicle 12 has been unplugged. The vehicle 12 may then execute its planned route to the park location 199, as represented by operation 320. A driver or operator may execute the planned route or the vehicle 12 may autonomously execute the route. The vehicle 12 may then be parked at the parking location 199, as represented by operation 214. The vehicle 12 may be shut off by a key-off event, as represented by operation 216.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a battery management system comprising:
commanding by a controller a heat exchanger of a vehicle to pre-cool a traction battery of the vehicle before vehicle key-off responsive to,
the vehicle being within a predetermined range of a predicted parking location, wherein the predicted parking location is based on a number of previous parking events within a period at the predicted parking location,
a current temperature of the traction battery being less than a temperature threshold, and
receiving a forecasted temperature of the predicted park location,
retrieving a solar irradiance value, stored within the controller, of the predicted park location,
a predicted parked temperature for the traction battery being greater than the temperature threshold, wherein the predicted parked temperature is based on the predicted temperature and the solar irradiance value of the predicted park location,
wherein the commanding is based on a difference between the predicted parked temperature and the temperature threshold.

2. The method of claim 1 wherein the commanding is responsive to the vehicle being plugged in and charging, a predicted parked temperature for the traction battery associated with a predicted parking event for a predicted trip being greater than a temperature threshold, and a current temperature of the traction battery being less than the temperature threshold.

3. The method of claim 1 wherein the predicted parked temperature is based on a predicted park duration based on a duration of each of the number of previous parking events at the predicted park location.

4. The method of claim 1 wherein the predicted parked temperature is based on the current temperature of the traction battery.

5. The method of claim 1 wherein the predicted parked temperature is based on a predicted temperature associated with predicted parking location.

6. A vehicle comprising:
a traction battery;
a battery chiller configured to cool the traction battery; and
a controller programmed to power the battery chiller to pre-cool the traction battery before vehicle key-off, responsive to the vehicle being within a predetermined range of a predicted parking location, a current temperature of the traction battery being less than a temperature threshold, and a predicted parked temperature for the traction battery being greater than the temperature threshold, wherein the predicted parked temperature is based on a forecasted temperature of the predicted park location and a solar irradiance of the predicted park location stored within the controller.

7. The vehicle of claim 6 wherein the controller is further programmed to command the battery chiller to cool the battery to a first pre-cooled temperature based on a difference between the predicted parked temperature and the temperature threshold.

8. The vehicle of claim 6 wherein the controller is further programmed to command the battery chiller to cool the battery responsive to the vehicle being plugged in and charging, a predicted parked temperature for the traction battery associated with a predicted parking event for a predicted trip being greater than a second-temperature threshold, and a current temperature of the traction battery being less than the second-temperature threshold.

9. The vehicle of claim 8 wherein the controller is further programmed to command the battery chiller to cool the battery to a second pre-cooled temperature.

10. The vehicle of claim 9 wherein the predicted park temperature is based on the current temperature of the traction battery.

11. The vehicle of claim 9 wherein the predicted park temperature is based on a predicted temperature associated with predicted parking location.

12. The vehicle of claim 6 wherein the predicted park temperature is based on a predicted parked duration.

13. A vehicle comprising:
a traction battery;
a controller programmed to power a heat exchanger to pre-cool the traction battery responsive to the vehicle being within a predetermined range of a predicted parking location based on a number of previous parking events within a period at the predicted parking location, a predicted parked temperature for the traction battery associated with a predicted parking event for a predicted trip being greater than a first temperature threshold, and a current temperature of the traction battery being less than the first temperature threshold, wherein the predicted parked temperature is based on a forecasted temperature of the predicted park location and a solar irradiance of the predicted park location stored within the controller.

14. The vehicle of claim 13 wherein the controller is further programmed to command the heat exchanger to cool the battery to a first pre-cooled temperature based on a difference between the predicted parked temperature and the first temperature threshold.

15. The vehicle of claim 13 wherein the controller is further programmed to, responsive to traveling within the predetermined range of a predicted parking location, and the predicted parked temperature for the traction battery being greater than a second temperature threshold, power the heat exchanger to pre-cool the battery.

16. The vehicle of claim 15 wherein the second temperature threshold is greater than the first temperature threshold.

17. The vehicle of claim 13 wherein the predicted parked temperature is based on a predicted parked duration.

18. The vehicle of claim 13 wherein the predicted parked temperature is based on a predicted temperature associated with predicted parking location.

19. The vehicle of claim 13 wherein the traction battery is pre-cooled before the vehicle is unplugged.

\* \* \* \* \*